United States Patent
Sato et al.

(10) Patent No.: US 8,793,934 B2
(45) Date of Patent: Aug. 5, 2014

(54) BELT MOLDING

(75) Inventors: Tomoya Sato, Kanagawa (JP); Takayuki Okada, Kanagawa (JP)

(73) Assignee: Shiroki Corporation, Fujisawa-Shi, Kanagawa (JP)

( * ) Notice: Subject to any disclaimer, the term of this patent is extended or adjusted under 35 U.S.C. 154(b) by 153 days.

(21) Appl. No.: 13/415,782

(22) Filed: Mar. 8, 2012

(65) Prior Publication Data

US 2012/0261933 A1    Oct. 18, 2012

(51) Int. Cl.
    *B60R 13/02*       (2006.01)
    *B60J 10/04*       (2006.01)
    *B60J 10/00*       (2006.01)
    *B60R 13/04*       (2006.01)

(52) U.S. Cl.
    CPC ............ *B60R 13/04* (2013.01); *B60J 10/041* (2013.01); *B60J 10/0051* (2013.01); *B60J 10/0005* (2013.01)
    USPC .......... 49/377; 52/716.5; 52/309.3; 52/716.6; 296/146.2; 296/146.9; 49/374; 49/495.1; 49/490.1

(58) Field of Classification Search
    CPC .. B60J 10/0005; B60J 10/0051; B60J 10/041; B60R 13/04
    USPC ............ 52/716.5, 716.6, 309.4, 716.1, 716.2, 52/716.4, 717.01, 718.06, 717.03, 717.04, 52/717.05; 296/146/1; 49/372, 374, 377, 49/495.1, 490.1
    See application file for complete search history.

(56) References Cited

U.S. PATENT DOCUMENTS

| | | | | |
|---|---|---|---|---|
| 4,880,674 | A * | 11/1989 | Shimizu | 428/31 |
| 5,817,414 | A * | 10/1998 | Ando | 428/358 |
| 6,826,883 | B2 * | 12/2004 | Guzman et al. | 52/716.5 |
| 7,121,060 | B1 * | 10/2006 | Cittadini et al. | 52/716.5 |
| 7,293,820 | B2 * | 11/2007 | Hashimoto et al. | 296/146.9 |
| 7,410,203 | B2 * | 8/2008 | Yatsuda et al. | 296/146.2 |
| 7,543,881 | B2 * | 6/2009 | Okajima et al. | 296/146.9 |
| 8,256,823 | B2 * | 9/2012 | Tamura | 296/93 |
| 2003/0200717 | A1 * | 10/2003 | Guzman et al. | 52/716.5 |
| 2006/0265995 | A1 * | 11/2006 | Yamada | 52/716.5 |
| 2007/0094997 | A1 * | 5/2007 | Katakura et al. | 52/716.5 |
| 2008/0122251 | A1 * | 5/2008 | Okajima et al. | 296/146.9 |
| 2009/0001754 | A1 * | 1/2009 | Tamaoki et al. | 296/146.9 |
| 2009/0007511 | A1 * | 1/2009 | Hause | 52/312 |
| 2009/0158687 | A1 * | 6/2009 | Stepan | 52/716.6 |
| 2010/0026042 | A1 * | 2/2010 | Ellis et al. | 296/146.2 |
| 2010/0242392 | A1 * | 9/2010 | Otsuka et al. | 52/309.4 |
| 2011/0012388 | A1 * | 1/2011 | Iida et al. | 296/146.9 |

FOREIGN PATENT DOCUMENTS

JP         3798657 B2     7/2006

* cited by examiner

*Primary Examiner* — William Gilbert
*Assistant Examiner* — Alp Akbasli
(74) *Attorney, Agent, or Firm* — McGinn IP Law Group, PLLC

(57) ABSTRACT

A belt molding for an automotive door panel includes a molding body made of a hard resin and having an outer wall and an inner wall; a design tape fusion-bonded to an outer surface of the outer wall; and a lip made of a soft resin and standing from the vicinity of an edge portion of the outer wall. The outer surface of the outer wall to which the design tape is fusion-bonded is convexly curved in a direction orthogonal to the longitudinal direction. An edge portion of the design tape is covered with a root portion of the lip. A largest curvature portion of the outer wall is located immediately under a covered portion of the design tape.

20 Claims, 5 Drawing Sheets

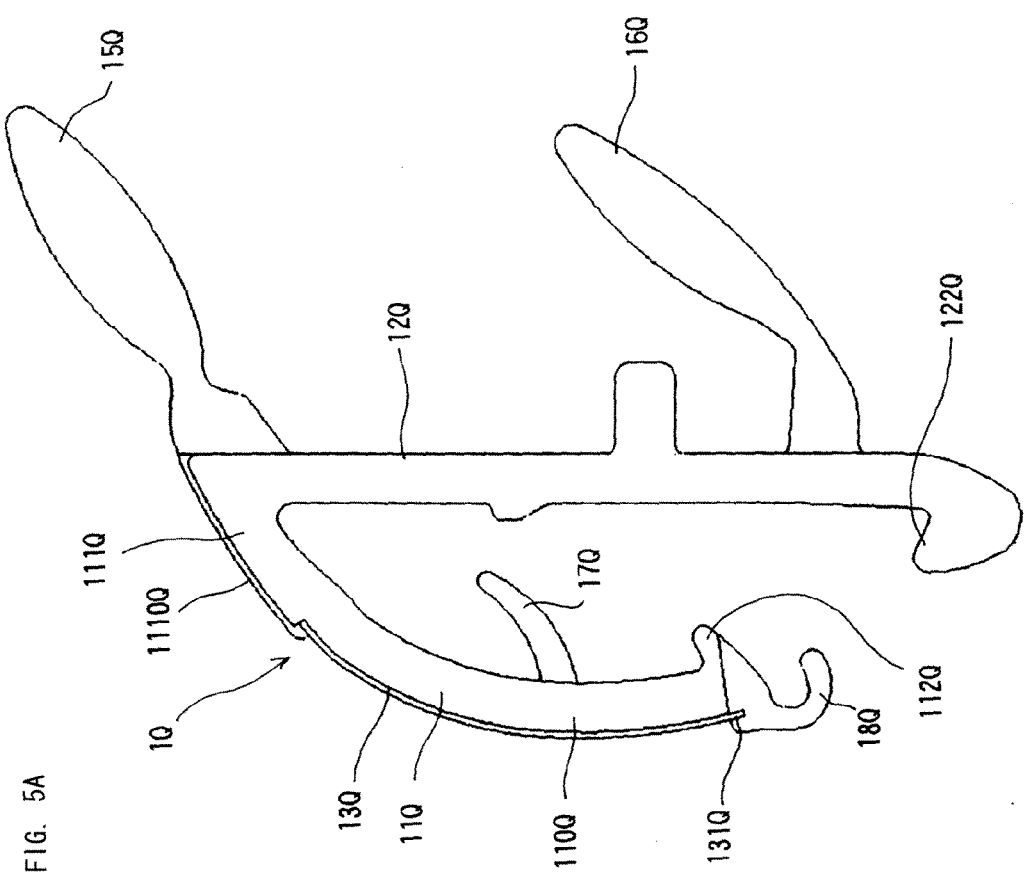
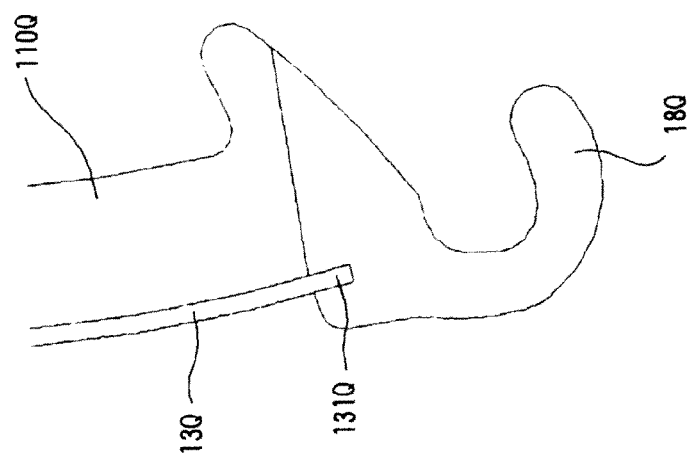
FIG. 5A
FIG. 5B

BELT MOLDING

BACKGROUND OF THE INVENTION

1. Field of the Invention

The present invention relates to a belt molding mounted to an upper edge portion of an automotive door panel. More particularly, the invention relates to a belt molding configured such that a design tape having gloss, such as a metallic gloss or a highly lustered color, is affixed (adhered or fusion-bonded) to the outer surface of a molding body made of a hard resin, along the longitudinal direction of the molding body.

2. Description of the Related Art

A belt molding configured such that a design tape is provided on the outer surface of a molding body along the longitudinal direction of the molding body is manufactured by a method described in, for example, Japanese Patent No. 3798657.

In order to meet demands on metal-cored moldings to reduce weight and cost, an attempt has been made to provide a design tape having gloss, such as a metallic gloss or a highly lustered color, on the outer surface of a belt molding made of a hard resin. FIGS. 4A to 4C show an example belt molding 1P having a design tape 13P. FIG. 4A is a sectional view taken along line S-S of FIG. 3B. Notably, the belt molding 1P of FIGS. 4A to 4C and a belt molding 1Q (which will be described later) of FIGS. 5A and 5B are those which had been studied in the process of devising belt moldings 1, 1A, and 1B of the present invention, and do not constitute prior art. The belt moldings 1P and 1Q partially include constituent elements of the present invention.

The belt molding 1P includes a molding body made of a hard resin (PP) and having an elongated outer wall 11P and an inner wall 12P extending downward from an upper edge portion of the outer wall 11P; a design tape 13P affixed, by fusion bonding or the like, along the longitudinal direction to an upper region of the outer surface of the outer wall 11P; an upper seal lip 15P made of a soft resin (TPO) and standing from an upper edge portion of the inner wall 12P in the vicinity of the upper edge portion of the outer wall 11P; a lower seal lip 16P made of a soft resin (TPO) and standing from a lower portion of the inner wall 12P; an upper tongue 17P made of a soft resin (TPO) and standing from a substantially central portion of the inner surface of the outer wall 11P; and a lower tongue 18P made of a soft resin (TPO) and extending from the lower end of the outer wall 11P.

The belt molding 1P is mounted to an automotive door panel 2 (see FIG. 3B) in such a manner as to nip an upper edge portion of the door panel 2 in a gap between the outer wall 11P and the inner wall 12P. By this procedure, the upper seal lip 15P and the lower seal lip 16P come in elastic, slidable contact with a window glass (not shown). Also, the upper tongue 17P and the lower tongue 18P come in elastic contact with the outer surface of the upper edge portion of the outer panel. Notably, PP is polypropylene, and TPO is thermoplastic polyolefin.

(1) First Problem (Wrinkles and Shrinkage)

The above-mentioned belt molding 1P is manufactured as follows: while the molding body (the outer wall 11P and the inner wall 12P) is being extrusion-molded, the upper seal lip 15P, the lower seal lip 16P, the upper tongue 17P, and the lower tongue 18P are extrusion-molded and fusion-bonded to corresponding regions of the molding body (the outer wall 11P and the inner wall 12P) for integration with the molding body; at the same time, the design tape 13P wound in roll is fed to be affixed to the outer surface of the outer wall 11P by fusion bonding or a like method. Thus, at the time when the design tape 13P is affixed to the outer wall 11P made of PP, the upper seal lip 15P, the lower tongue 18P, etc., made of TPO are in such a molten state as to allow fusion-bonding thereof to the molding body made of PP.

Meanwhile, in view of design, the design tape 13P affixed to the outer wall 11P must be covered at its opposite edge portions with certain members while as large an apparent width as possible is secured. This is for the following reason: if an edge of the design tape 13P of a product is exposed, the design tape 13P is apt to come off from the exposed edge, and a misaligned edge, if any, looks unattractive. In order to cope with this problem, in the example of FIGS. 4A and 4B, an upper edge portion 131P of the design tape 13P is covered with a root portion of the upper seal lip 15P made of TPO, and a lower edge portion of the design tape 13P is covered with an upper edge portion of a TPO layer 1110P.

However, when the above-mentioned practice is employed, as shown in the enlarged view of FIG. 4B, the distal end of the upper edge portion 131P of the thin design tape 13P protrudes into TPO which is in such a molten state as to allow fusion-bonding, and may move in a supportless condition. As a result, wrinkles form in the upper edge portion 131P; the wrinkles are propagated from the upper edge portion 131P toward the center of the width of the design tape 13P; and an exposed design surface suffers from an appearance defect, such as wrinkles. An object of the present invention is to prevent the occurrence of such an appearance defect. By contrast, a portion of the design tape 13P in the vicinity of the lower edge portion of the design tape 13P covered with the TPO layer 1110P is free from formation of wrinkles, since that portion is affixed to the outer wall 11P made of PP.

FIG. 4C shows an example measure to prevent formation of the above-mentioned wrinkles. In FIG. 4C, an upper edge portion of the design tape 13P is bent and affixed to the surface of an upper edge portion of the inner wall 12P. The bent, affixed portion is denoted by 131PP. However, this raises another problem of difficulty in peeling off a protection film. That is, at the time of shipment, the surface of the design tape 13P is covered with a protection film; thus, after manufacture of the belt molding, the protection film must be peeled off. Specifically, the belt molding extruded from an extrusion-molding machine is cooled and cut into pieces each having a predetermined length; then, the protection film must be peeled off. At this time, the bent, affixed portion 131PP causes difficulty in peeling off the protection film. An attempt to forcibly peel off the protection film causes, for example, breakage of a root portion of the upper seal lip 15P. Therefore, the method shown in FIG. 4C cannot be employed.

(2) Second Problem

Next will be described another problem involved in a belt molding in which a design tape having gloss, such as a metallic gloss or a highly lustered color, is affixed. In the belt molding having the design tape affixed, in order to prevent an appearance defect (distortion of a reflection image (flaring appearance) stemming from uneven or nonuniform reflectional direction), a surface to which the design tape is to be affixed must have high flatness and smoothness. When the surface to which the design tape is to be affixed is even slightly poor in flatness and smoothness, uneven or nonuniform reflectional direction causes the distortion of a reflection image (in actuality, the "reflection image" is not so clear as to be said to be an image), resulting in so-called flaring appearance. Therefore, the surface must have high flatness and smoothness. However, an attempt to achieve such high flatness and smoothness is very costly.

Another object of the present invention is to sufficiently restrain the distortion of a reflection image (flaring appearance) stemming from uneven or nonuniform reflectional direction without involvement of a great increase in cost, for a belt molding having an affixed design tape having gloss, such as a metallic gloss or a highly lustered color.

(3) Belt Molding of FIGS. 5A and 5B

Problems (wrinkles and shrinkage, and flaring appearance) to be solved by the present invention have been described above with reference to the belt molding 1P of FIGS. 4A to 4C. Next, problems to be solved by the present invention will be described with reference to a belt molding 1Q of FIGS. 5A and 5B. Similar to FIG. 4A, FIG. 5A is a sectional view taken along line S-S of FIG. 3B. The letter P is a suffix indicative of the belt molding of FIGS. 4A to 4C. Similarly, the letter Q is a suffix indicative of the belt molding of FIGS. 5A and 5B. As for numerals appearing in figures, FIGS. 4A to 4C and FIGS. 5A and 5B use like numerals for equivalent structural portions or members. The following description covers only features different from those of FIGS. 4A to 4C.

The belt molding 1Q shown in FIG. 5A includes a molding body made of a hard resin (PP) and having an elongated outer wall 11Q and an inner wall 12Q extending downward from an upper edge portion of the outer wall 11Q; a design tape 13Q affixed along the longitudinal direction to a lower region of the outer surface of the outer wall 11Q; a lower tongue 18Q made of a soft resin (TPO) and extending from the lower end of the outer wall 11Q; an upper seal lip 15Q made of a soft resin (TPO) and standing from an upper edge portion of the inner wall 12Q; a lower seal lip 16Q made of a soft resin (TPO) and standing from a lower portion of the inner wall 12Q; and an upper tongue 17Q made of a soft resin (TPO) and standing from a substantially central portion of the inner surface of the outer wall 11Q. Similar to the belt molding 1P, the belt molding 1Q is also mounted to the automotive door panel 2 (see FIG. 3B) in such a manner as to nip an upper edge portion of the door panel 2 in a gap between the outer wall 11Q and the inner wall 12Q.

As is understood from comparison between FIGS. 4A to 4C and FIGS. 5A and 5B, in the belt molding 1Q of FIGS. 5A and 5B, the design tape 13Q is affixed to a lower region of the outer wall 11Q; thus, the above-mentioned problem of wrinkles and shrinkage (the first problem) arises on a side toward a lower edge portion 131Q of the design tape 13Q. Except for this, the belt molding 1Q is similar to the belt molding 1P of FIGS. 4A to 4C. As for flaring appearance (the second problem), the belt molding 1Q is similar to the belt molding 1P of FIGS. 4A to 4C.

In FIGS. 4A to 4C (FIGS. 5A and 5B), since the width of the design tape 13P (13Q) is narrower than that of the outer wall 11P (11Q), the design tape 13P (13Q) is affixed to an upper region of the outer wall 11P (a lower region of the outer wall 11Q). As a result, the problem of wrinkles and shrinkage (the first problem) arises on a side toward the upper edge portion 131P of the design tape 13P (on a side toward the lower edge portion 131Q of the design tape 13Q). However, needless to say, in the case of using a design tape having a width substantially equal to that of the outer wall, the problem of wrinkles and shrinkage (the first problem) arises on both sides toward an upper edge portion and a lower edge portion of the design tape.

SUMMARY OF THE INVENTION

The present invention is configured as mentioned below in [1] and [2]. Reference numerals appearing in the present section are provided for convenience of understanding and should not be construed as limiting the invention.

Configuration 1

[1-1] See FIGS. 1A to 1C.

A belt molding 1 comprises a molding body made of a hard resin and having an elongated outer wall 11 and an inner wall 12 extending downward from an upper edge portion of the outer wall 11; a design tape 13 affixed to an outer surface of the outer wall 11; and a lip 15 made of a soft resin and standing from the vicinity of at least one of two edge portions of the outer wall 11 (an upper edge portion and/or a lower edge portion of the outer wall 11; in the example of FIGS. 1A to 1C, the upper edge portion of the outer wall 11). The belt molding 1 is mounted to an automotive door panel 2 in such a manner as to nip an upper edge portion of the door panel 2 in a gap between the outer wall 11 and the inner wall 12.

The outer surface of the outer wall 11 to which the design tape 13 is affixed is convexly curved in a direction orthogonal to a longitudinal direction. At least one edge portion 131 of two edge portions of the affixed design tape 13 has a covered subportion 13-$c$ covered with a root portion 151 of the lip 15 and located on a side toward an end of the edge portion 131, and an exposed subportion 13-$e$ extending from the covered subportion 13-$c$. The outer wall 11 has a largest curvature portion 13-$m$*110 located in a region corresponding to the covered subportion 13-$c$ of the design tape 13 and having a curvature larger than that in a region corresponding to the exposed subportion 13-$e$ of the design tape 13.

The term "affix" means to unremovably cover an object or a portion thereof, and the concept of "affix" encompasses fusion bonding and adhesion.

The inner wall 12 extends downward from an upper edge portion of the outer wall 11. In this regard, "upper" in "upper edge portion" complies with the concept of "upper" and "lower" in the case where the automotive door panel 2 to which the belt molding 1 is mounted to an automotive body. This also applies to [1-2] and [1-3] below.

The curvature of a portion of the outer wall 11 located on a side toward an end of the outer wall 11 with respect to the largest curvature portion 13-$m$*110 (the distal end of at least one of two edge portions of the outer wall 11) may be equal to or less than that of the largest curvature portion 13-$m$*110. No particular limitation is imposed on the curvature magnitude relation between the portion of the outer wall 11 located on the side toward an end of the outer wall 11 with respect to the largest curvature portion 13-$m$*110 and a portion of the outer wall 11 corresponding to the exposed subportion 13-$e$ of the design tape 13. That is, the curvature of the portion of the outer wall 11 located on the side toward an end of the outer wall 11 with respect to the largest curvature portion 13-$m$*110 may be greater than, equal to, or smaller than that of the portion of the outer wall 11 corresponding to the exposed subportion 13-$e$ of the design tape 13. Also, the curvature of the portion of the outer wall 11 located on the side toward an end of the outer wall 11 with respect to the largest curvature portion 13-$m$*110 may be zero (i.e., the portion may be straight). This also applies to the examples shown in FIGS. 2A and 2B and FIG. 3A.

The employment of configuration 1 can prevent the formation of wrinkles in the edge portion 131 of the design tape 13, along with the shrinkage of the design tape 13 which would otherwise result from the formation of the wrinkles, and can restrain uneven or nonuniform reflection direction of reflected light from the design tape 13. Also, additional costs for such preventive or restraining measures are unnecessary. This also applies to belt moldings 1A and 1B mentioned below.

[1-2] See FIGS. 2A and 2B.

A belt molding 1A comprises a molding body made of a hard resin and having an elongated outer wall 11A and an inner wall 12A extending downward from an upper edge portion of the outer wall 11A; a design tape 13A affixed to an outer surface of the outer wall 11A; and a lip (lower tongue) 18A made of a soft resin and standing from the vicinity of at least one of two edge portions of the outer wall 11A (an upper edge portion and/or a lower edge portion of the outer wall 11A; in the example of FIGS. 2A and 2B, the lower edge portion of the outer wall 11A). The belt molding 1A is mounted to the automotive door panel 2 in such a manner as to nip an upper edge portion of the door panel 2 in a gap between the outer wall 11A and the inner wall 12A.

The outer surface of the outer wall 11A to which the design tape 13A is affixed is convexly curved in a direction orthogonal to a longitudinal direction. At least one edge portion 131A of two edge portions of the affixed design tape 13A has a covered subportion 13A-c covered with a root portion 181A of the lip 18A and located on a side toward an end of the edge portion 131A, and an exposed subportion 13A-e extending from the covered subportion 13A-c. The outer wall 11A has a largest curvature portion 13A-m*110A located in a region corresponding to the covered subportion 13A-c of the design tape 13A and having a curvature larger than that in a region corresponding to the exposed subportion 13A-e of the design tape 13A.

[1-3] See FIG. 3A.

A belt molding 1B comprises a molding body made of a hard resin and having an elongated outer wall 11B and an inner wall 12B extending downward from an upper edge portion of the outer wall 11B; a design tape 13B affixed to an outer surface of the outer wall 11B; and a lip 15B (a lip (lower tongue) 18B) made of a soft resin and standing from the vicinity of at least one of two edge portions of the outer wall 11B (an upper edge portion and/or a lower edge portion of the outer wall 11B; in the example of FIG. 3A, the upper and lower edge portions of the outer wall 11B). The belt molding 1B is mounted to the automotive door panel 2 in such a manner as to nip an upper edge portion of the door panel 2 in a gap between the outer wall 11B and the inner wall 12B.

The outer surface of the outer wall 11B to which the design tape 13B is affixed is convexly curved in a direction orthogonal to a longitudinal direction. At least one edge portion 131B of two edge portions 131B and 131BB of the affixed design tape 13B has a covered subportion 13B-c (13BB-c) covered with a root portion 151B (181B) of the lip 15B (the lip (lower tongue) 18B) and located on a side toward an end of the edge portion 131B (131BB), and an exposed subportion 13B-e extending from the covered subportion 13B-c (13BB-c). The outer wall 11B has a largest curvature portion 13B-m*110B (13BB-m*110BB) located in a region corresponding to the covered subportion 13B-c (13BB-c) of the design tape 13B and having a curvature larger than that in a region corresponding to the exposed subportion 13B-e of the design tape 13B.

Configuration 2

In the belt molding 1 (1A or 1B) of configuration 1, a portion of the outer wall corresponding to at least one edge portion 131 (131A, or 131B and 131BB) of the two edge portions of the design tape 13 (13A or 13B) protrudes into the root portion 151 (181A, or 151B and 181B) of the lip 15 (18A, or 15B and 18B).

The root portion 151 (181A, or 151B and 181B) is where the lip 15 (18A, or 15B and 18B) is fusion-bonded to an upper edge portion of the outer wall 11 and an upper edge portion of the inner wall 12 (to a lower edge portion of the outer wall 11A, or to an upper edge portion of the outer wall 11B and an upper edge portion of the inner wall 12B as well as to a lower edge portion of the outer wall 11B).

In addition to the effect of configuration 1, configuration 2 yields the following effect: the edge portion 131 (131A, or 131B and 131BB) of the design tape 13 (13A or 13B) can be sufficiently covered without need to changing outside dimensions of the belt molding.

BRIEF DESCRIPTION OF THE DRAWINGS

FIGS. 1A to 1C are sectional views taken along line S-S of FIG. 3B, showing a belt molding according to a first embodiment of the present invention and having features of the present invention at an upper edge portion of the belt molding, wherein FIG. 1A shows the entire configuration of the belt molding, FIG. 1B shows, on an enlarged scale, a main portion of the belt molding, and FIG. 1C shows, on an enlarged scale, a main portion of a belt molding according to a modification;

FIGS. 2A and 2B are sectional views taken along line S-S of FIG. 3B, showing a belt molding according to a second embodiment of the present invention and having features of the present invention at a lower edge portion of the belt molding, wherein FIG. 2A shows the entire configuration of the belt molding, and FIG. 2B shows, on an enlarged scale, a main portion of the belt molding;

FIGS. 4A to 4C are sectional views taken along line S-S of FIG. 3B, showing a belt molding corresponding to that of the first embodiment and having a defect, wherein FIG. 4A shows the entire configuration of the belt molding, FIG. 4B shows, on an enlarged scale, a main portion of the belt molding, and FIG. 4C shows, on an enlarged scale, a main portion of a belt molding according to a modification; and FIGS. 5A and 5B are sectional views taken along line S-S of FIG. 3B, showing a belt molding corresponding to that of the second embodiment and having a defect, wherein FIG. 5A shows the entire configuration of the belt molding and FIG. 5B shows, on an enlarged scale, a main portion of the belt molding.

DESCRIPTION OF THE PREFERRED EMBODIMENTS

Embodiments of the present invention will next be described with reference to the drawings.

Figure 1B:
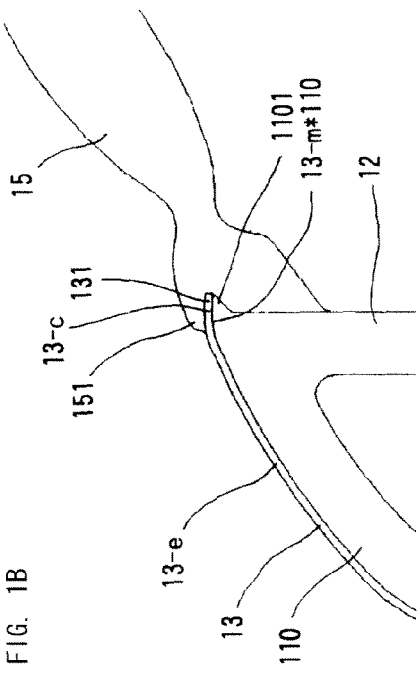
Figure 1C:
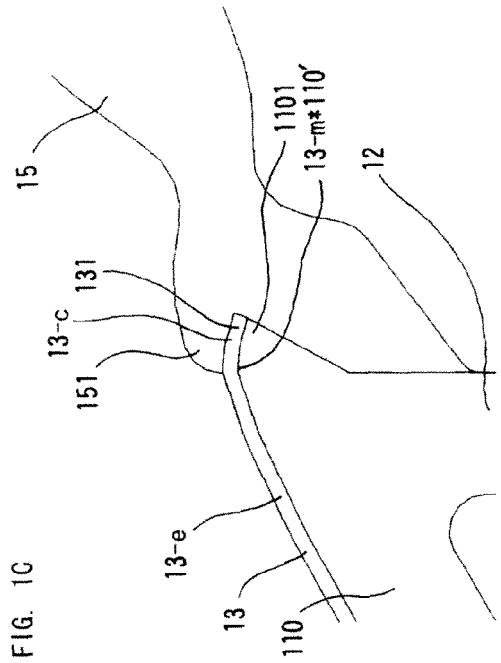
Figure 1A:
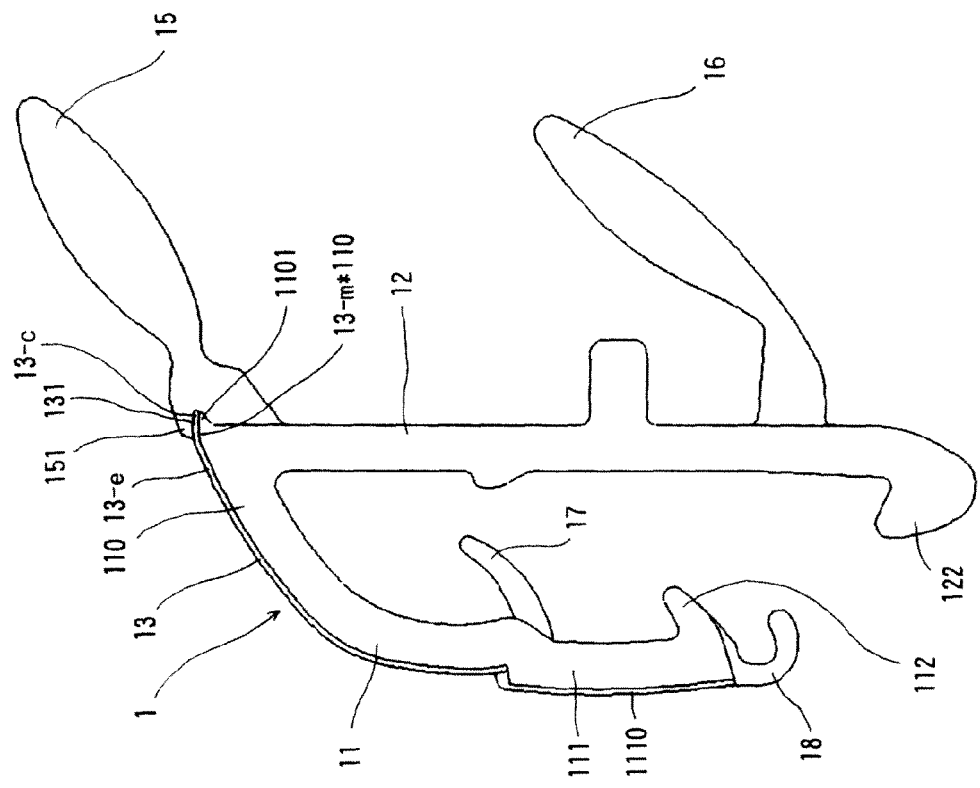

(1) First Embodiment (FIGS. 1A to 1C)

A belt molding 1 shown in FIGS. 1A to 1C includes a molding body made of a hard resin (PP) and having an elongated outer wall 11 and an inner wall 12 extending downward from an upper edge portion of the outer wall 11; a design tape 13 fusion-bonded along the longitudinal direction to an upper region of the outer surface of the outer wall 11 (to an outer-wall tape bed portion 110); an upper seal lip 15 made of a soft resin (TPO) and standing from an upper edge portion of the inner wall 12 in the vicinity of the upper edge portion of the outer wall 11; a lower seal lip 16 made of a soft resin (TPO) and standing from a lower portion of the inner wall 12; an upper tongue 17 made of a soft resin (TPO) and standing from a substantially central portion of the inner surface of the outer wall 11; and a lower tongue (lip) 18 made of a soft resin (TPO) and extending from the lower end of the outer wall 11. Furthermore, an outer wall engagement portion 112 stands, toward the inside of the molding body, from an inner surface of the outer wall 11 in the vicinity of the lower end of the outer wall 11. Similarly, an inner wall engagement portion 122 stands from an inner surface of the inner wall 12 in the vicinity of the lower end of the inner wall 12.

The belt molding 1 is mounted to an automotive door panel 2 in the following manner: while an upper edge portion of the door panel 2 is nipped in a gap between the outer wall 11 and the inner wall 12, the outer wall engagement portion 112 and the inner wall engagement portion 122 are engaged with corresponding portions of the door panel 2. By this procedure, the upper seal lip 15 and the lower seal lip 16 come into an elastically slidable contact with a window glass (not shown). Also, the upper tongue 17 and the lower tongue 18 come into an elastic contact with an upper edge portion of an outer panel.

The outer wall 11 of the belt molding 1 has the outer-wall tape bed portion 110 in its upper region. The design tape 13 is fusion-bonded to the outer wall 11 in such a manner as to cover the surface of the outer-wall tape bed portion 110. The surface of the outer-wall tape bed portion 110 is convexly curved in a direction orthogonal to the longitudinal direction (in a cross-section of the width direction as shown in FIG. 1A). The outer wall 11 also has a tape edge support subportion 1101 at an upper edge subportion of the outer-wall tape bed portion 110 (the upper edge subportion of the outer-wall tape bed portion 110 serves also as an upper edge portion of the inner wall 12). The tape edge support subportion 1101 extends from the outer-wall tape bed portion 110, has a tape bonding surface, and protrudes into a root portion 151 of the upper seal lip 15. As a result of an upper edge portion 131 of the design tape 13 being fusion-bonded to the tape bonding surface of the tape edge support subportion 1101, the upper edge portion 131 of the design tape 13 is covered with the root portion 151 of the upper seal lip 15. That is, a covered subportion 13-*c* is formed. An exposed subportion 13-*e* extends inward (to the left in FIGS. 1A to 1C) from the covered subportion 13-*c*. The exposed subportion 13-*e* is exposed rather than covered with the root portion 151 of the upper seal lip 15.

The outer-wall tape bed portion 110 has a largest curvature portion 13-*m*\*110 which is located in a region corresponding to the covered subportion 13-*c* (a region just under the covered subportion 13-*c*) and whose surface curvature is the largest in the region corresponding to the covered subportion 13-*c* (in the region just under the covered subportion 13-*c*) and a region corresponding to the exposed subportion 13-*e* (a region just under the exposed subportion 13-*e*). For example, in the example of FIG. 1B, the largest curvature portion 13-*m*\*110 is located in a region corresponding to a position which is slightly offset into the covered subportion 13-*c* from the boundary between the covered subportion 13-*c* and the exposed subportion 13-*e* (located in a region just under the offset position). Also, in the example of FIG. 1C, a largest curvature portion 13-*m*\*110' is located in a region corresponding to a position which substantially coincides with the boundary between the covered subportion 13-*c* and the exposed subportion 13-*e* (a position which coincides with the boundary or is slightly offset from the boundary into the covered subportion 13-*c*) (the largest curvature portion 13-*m*\*110 is located in a region just under the boundary or the offset position).

No particular limitation is imposed on the curvature magnitude relation between a region corresponding to the exposed subportion 13-*e* (a region just under the exposed subportion 13-*e*) and a region corresponding to the covered subportion 13-*c* (a region just under the covered subportion 13-*c*) and excluding the largest curvature portion 13-*m*\*110. That is, the curvature in the region corresponding to the covered subportion 13-*c* (the region just under the covered subportion 13-*c*) and excluding the largest curvature portion 13-*m*\*110 may be greater than, smaller than, or equal to the curvature in the region corresponding to the exposed subportion 13-*e* (the region just under the exposed subportion 13-*e*). As mentioned above, "the surface of the outer-wall tape bed portion 110 is convexly curved in a direction orthogonal to the longitudinal direction (in a cross-section of the width direction as shown in FIG. 1A)." However, the region corresponding to the covered subportion 13-*c* (the region just under the covered subportion 13-*c*) and excluding the largest curvature portion 13-*m*\*110 may have a curvature of "zero"; i.e., the region may be straight. These curvature features also apply to second and third embodiments, which will be described later; specifically, to regions corresponding to covered subportions 13A-c and 13B-c (regions just under the covered subportions 13A-c and 13B-c) in the second and third embodiments, respectively.

Since, as mentioned above, the surface of the outer-wall tape bed portion 110 is convexly curved in a direction orthogonal to the longitudinal direction (in a cross-section of the width direction as shown in FIG. 1A), as viewed on a section taken orthogonally to the longitudinal direction, light rays reflected from the surface of the design tape 13 are directed radially rather than parallelly, even in an ideal state. Therefore, even when the surface of the outer-wall tape bed portion 110 somewhat poor in smoothness, the disarray of directions of reflected light rays becomes inconspicuous. Accordingly, the distortion of image, or so-called flaring appearance, also becomes inconspicuous. Also, as a result of the curved formation, a lower edge subportion of the outer-wall tape bed portion 110 is greatly recessed from an upper edge subportion of an adjacent outer-wall exposed bed portion 111. Thus, an upper edge subportion of an outer-wall exposed surface portion 1110, which serves as an upper layer of the outer-wall exposed bed portion 111 and is formed by use of relatively hard TPO, can cover a lower edge portion of the design tape 13 with a sufficient thickness. Therefore, the design tape 13 can be reliably prevented from coming off at its lower edge portion. Meanwhile, in FIG. 1A, an upward extension line of the surface of the outer-wall exposed surface portion 1110 shows the original outline of the belt molding. In other words, the external shape of the outer wall 11 is the same as that of a conventional belt molding. Thus, a modification in test elements which become necessary in relation to fitting of other relevant members can be minimized. Also, as mentioned above, the tape edge support subportion 1101 extending from the outer-wall tape bed portion 110 and having the tape bonding surface protrudes into the root portion 151 of the upper seal lip 15. Therefore, the edge portion 131 of the design tape 13 can be sufficiently covered without need to changing outside dimensions of the former belt molding.

Also, as mentioned above, in the outer-wall tape bed portion 110, the largest curvature portion 13-*m*\*110 is located in a region corresponding to the covered subportion 13-*c* (a region just under the covered subportion 13-*c*), which is a hidden subportion, rather than in a region corresponding to the exposed subportion 13-*e* (a region just under the exposed subportion 13-*e*). Thus, some tension can be applied to the design tape 13 provided on the surface of the outer-wall tape bed portion 110 without spoiling the design. As a result, there can be further enhanced the effect of rendering the distortion of image, or so-called flaring appearance, inconspicuous.

Figure 2B:
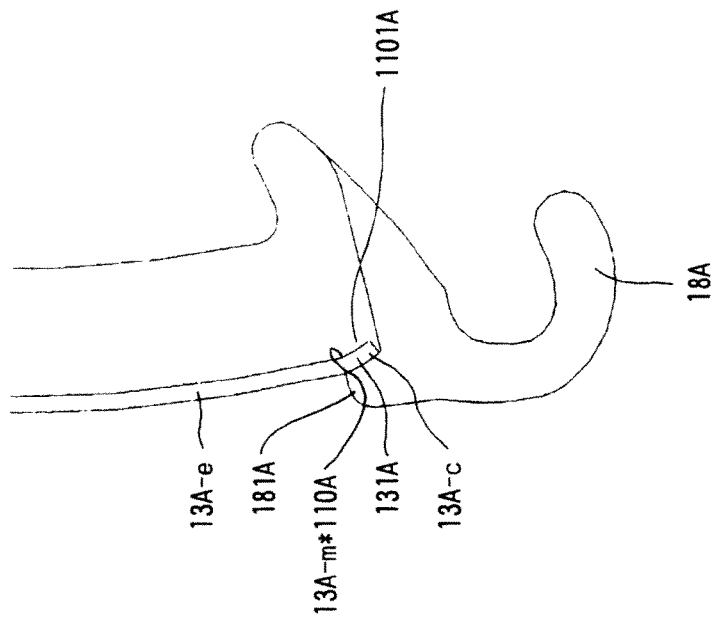
Figure 2A:
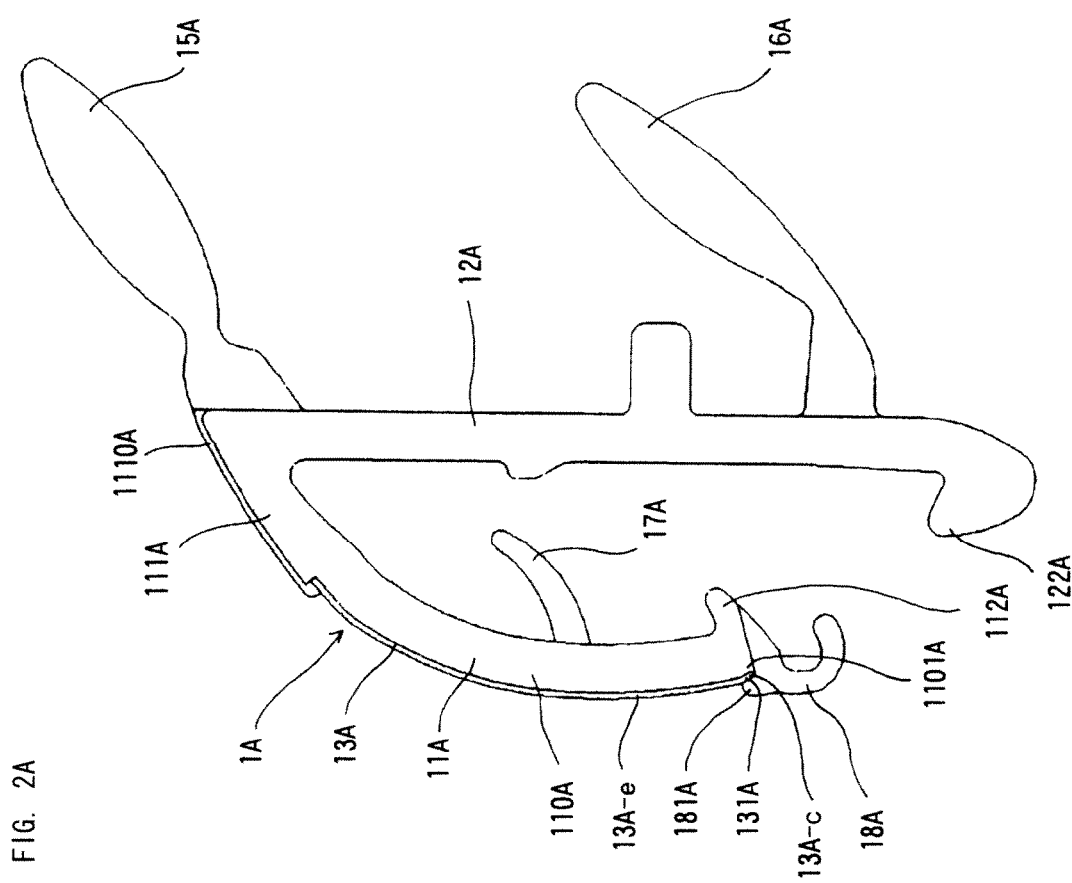

(2) Second Embodiment (FIGS. 2A and 2B)

A second embodiment of the present invention will next be described.

FIGS. 1A to 1C showing the first embodiment use only numerals as reference numerals; i.e., the reference numerals do not include alphabetic suffixes. However, FIGS. 2A and 2B showing the second embodiment use reference numerals having the suffix "A," which indicates that configurational features appearing in FIGS. 2A and 2B are of a belt molding 1A of the second embodiment. Like configurational features in FIGS. 1A to 1C and FIGS. 2A and 2B are denoted by like numerals in reference numerals (in FIGS. 2A and 2B, numerals preceding the letter "A"). The following description focuses on features different from those of the first embodiment, and repeated description of like features is omitted.

The belt molding 1A shown in FIGS. 2A and 2B includes a molding body made of a hard resin (PP) and having an elongated outer wall 11A and an inner wall 12A extending downward from an upper edge portion of the outer wall 11A; a design tape 13A fusion-bonded along the longitudinal direction to a lower region of the outer surface of the outer wall 11A (to an outer-wall tape bed portion 110A); a lower tongue (lip) 18A made of a soft resin (TPO) and extending from the lower end of the outer wall 11A; an upper seal lip 15A made of a soft resin (TPO) and standing from an upper edge portion of the inner wall 12A in the vicinity of the upper edge portion of the outer wall 11A; a lower seal lip 16A made of a soft resin (TPO) and standing from a lower portion of the inner wall 12A; and an upper tongue 17A made of a soft resin (TPO) and standing from a substantially central portion of the inner surface of the outer wall 11A. Furthermore, an outer wall engagement portion 112A stands, toward the inside of the molding body, from an inner surface of the outer wall 11A in the vicinity of the lower end of the outer wall 11A. Similarly, an inner wall engagement portion 122A stands from an inner surface of the inner wall 12A in the vicinity of the lower end of the inner wall 12A.

As is understood from comparison between FIGS. 1A to 1C and FIGS. 2A and 2B, in the belt molding 1A of FIGS. 2A and 2B, the design tape 13A is fusion-bonded to the outer-wall tape bed portion 110A provided in a lower region of the outer wall 11A. Thus, if no measures are taken, the problem of wrinkles and shrinkage associated with the vicinity of an edge portion of the design tape 13A arises on a side toward a lower edge portion 131A of the design tape 13A.

In order to solve the above problem, the second embodiment employs the following measures. As shown in FIG. 2B, the lower end of the outer-wall tape bed portion 110A protrudes into a root portion 181A of the lower tongue (lip) 18A, thereby forming a tape edge support subportion 1101A extending from the outer-wall tape bed portion 110A and having a tape bonding surface. The lower edge portion 131A of the design tape 13A is fusion-bonded to the surface of the tape edge support subportion 1101A. Also, a largest curvature portion 13A-m*110A is provided in a region corresponding to the covered subportion 13A-c (a region just under the covered subportion 13A-c).

Figure 3B:
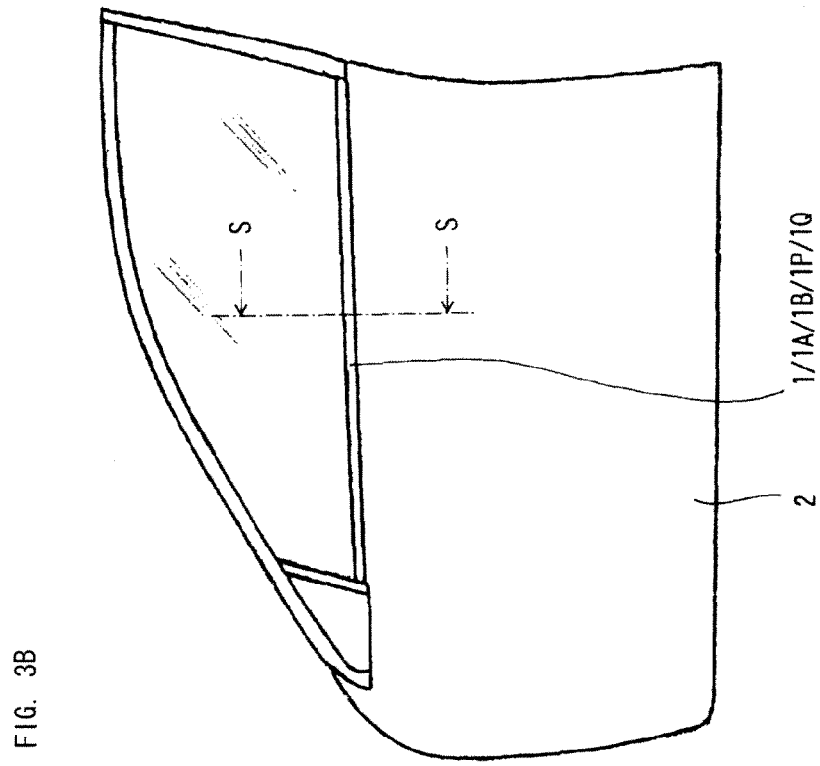
FIG. 3B is a schematic view showing where a conventional belt molding and the belt moldings of the present invention are mounted.
Figure 3A:
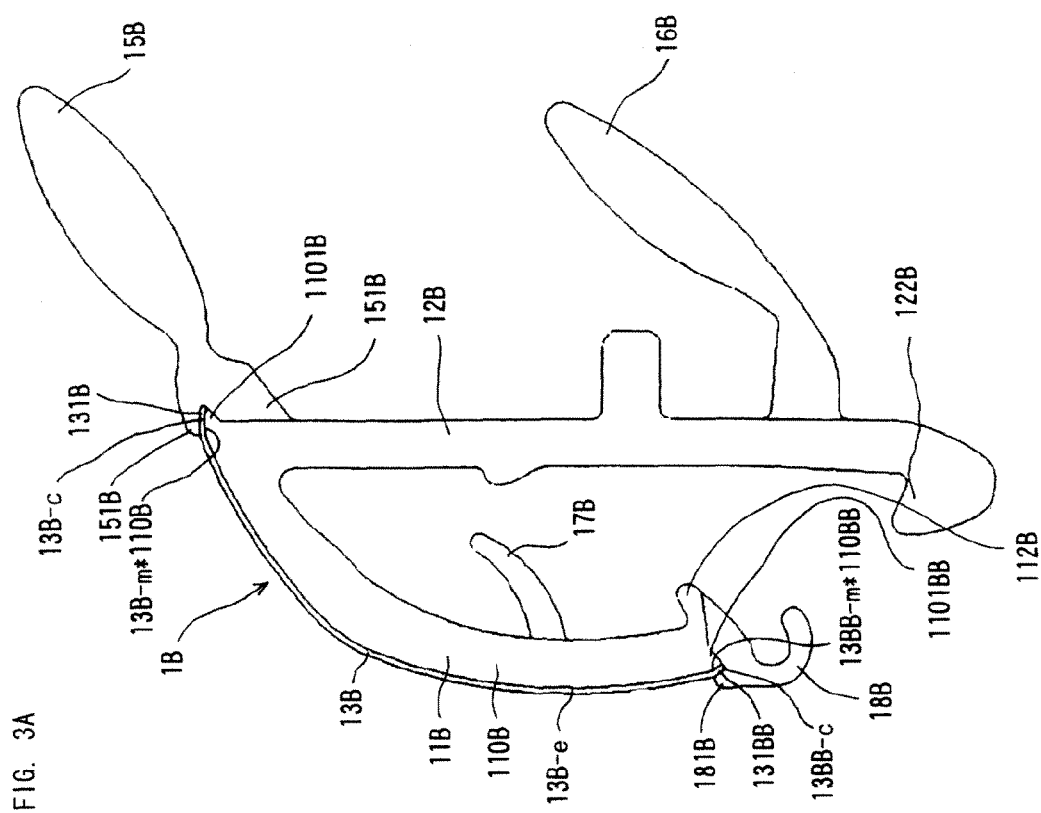
FIG. 3A is a sectional view taken along line S-S of FIG. 3B, showing a belt molding according to a third embodiment of the present invention and having features of the present invention at an upper edge portion and a lower edge portion of the belt molding.
Figure 4B:
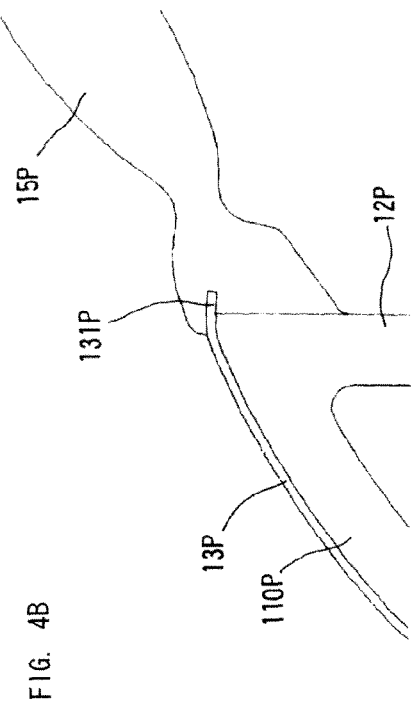
Figure 4C:
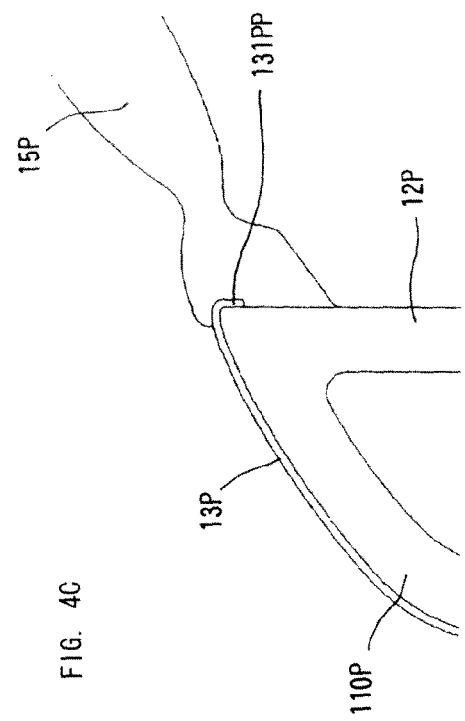
Figure 4A:
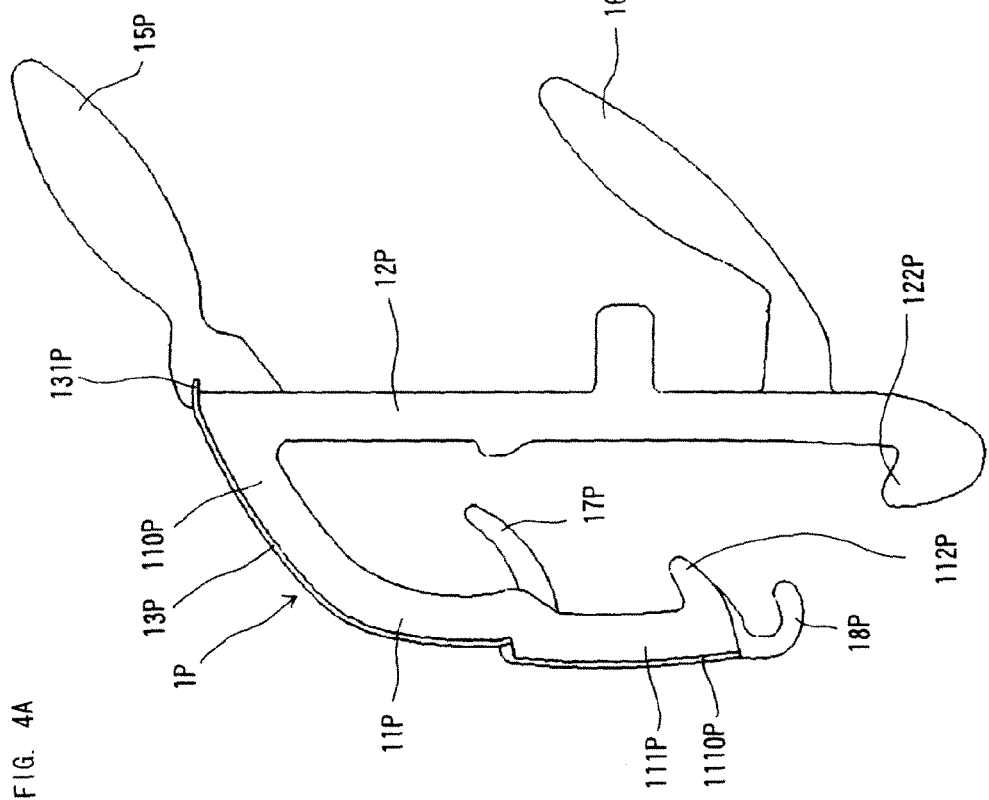

(3) Third Embodiment (FIG. 3A)

A third embodiment of the present invention employs measures similar to those of the first embodiment for an upper edge portion 131B of a design tape 13B as well as measures similar to those of the second embodiment for a lower edge portion 131BB of the design tape 13B. Thus, an effect similar to that of the first embodiment is yielded for the upper edge portion 131B, and an effect similar to that of the second embodiment is yielded for the lower edge portion 131BB.

What is claimed is:

1. A belt molding, comprising:
    a molding body comprising an elongated outer wall comprising a first resin and an inner wall extending downward from an upper edge portion of the outer wall;
    a design tape affixed to an outer surface of a tape bed portion in the outer wall; and
    a lip comprising a second resin and extending from a vicinity of at least one of edge portions of the tape bed portion, a hardness of the second resin being less than a hardness of the first resin,
    wherein the outer surface of the tape bed portion is convexly curved,
    wherein the design tape comprises a covered subportion covered with a root portion of the lip, and an exposed subportion extending from the covered subportion, and
    wherein a largest curvature portion of the outer surface of the tape bed portion is located in a region just under the covered subportion such that the largest curvature portion has a curvature larger than a curvature in a region just under the exposed subportion.

2. A belt molding according to claim 1, wherein the belt molding is mounted to an automotive door panel in such a manner as to nip an upper edge portion of the door panel in a gap between the outer wall and the inner wall.

3. A belt molding according to claim 2, further comprising:
    an upper tongue extending from a central portion of an inner surface of the outer wall; and
    a lower tongue extending from a lower end of the outer wall.

4. A belt molding according to claim 3, wherein the upper tongue and the lower tongue are in an elastic contact with the upper edge portion of the door panel.

5. A belt molding according to claim 4, further comprising:
    an outer wall engagement portion that extends toward an inside of the molding body from an inner surface of the outer wall in a vicinity of the lower end of the outer wall; and
    an inner wall engagement portion that extends from an inner surface of the inner wall in a vicinity of a lower end of the inner wall.

6. A belt molding according to claim 5, wherein the outer wall engagement portion and the inner wall engagement portion are engaged with corresponding portions of the door panel.

7. A belt molding according to claim 1, wherein an edge portion of the two edge portions of the tape bed portion located just under the covered subportion, covered with the root portion of the lip, protrudes into the root portion of the lip.

8. A belt molding according to claim 1, wherein the root portion is located at a position that the lip is fusion-bonded to the upper edge portion of the outer wall and an upper edge portion of the inner wall.

9. A belt molding according to claim 1, wherein the lip is fusion-bonded to the upper edge portion of the outer wall and an upper edge portion of the inner wall, and
    wherein the design tape is fusion-bonded to an upper region of the outer surface of the outer wall.

10. A belt molding, comprising:
a molding body comprising an elongated outer wall comprising a hard resin and an inner wall extending downward from an upper edge portion of the outer wall;
a design tape affixed to an outer surface of a tape bed portion in the outer wall; and
a lip comprising a soft resin and standing from a vicinity of at least one of two edge portions of the tape bed portion outer wall,
wherein the belt molding is mounted to an automotive door panel in such a manner as to nip an upper edge portion of the door panel in a gap between the outer wall and the inner wall,
wherein the outer surface of the tape bed portion is convexly curved in a direction orthogonal to a longitudinal direction,
wherein the design tape comprises a covered subportion covered with a root portion of the lip, and an exposed subportion extending from the covered subportion, and
wherein the outer surface of the tape bed portion has a large curvature portion located in a region lust under the covered subportion having a curvature larger than that in a region just under the exposed subportion.

11. A belt molding according to claim 10, wherein an edge portion of the two edge portions of the tape bed portion protrudes into the root portion of the lip.

12. A belt molding according to claim 10, wherein a hardness of the hard resin is more than a hardness of the soft resin.

13. A belt molding according to claim 10, wherein an edge portion of the two edge portions of the tape bed portion located just under the covered subportion, covered with the root portion of the lip, protrudes into the root portion of the lip.

14. A belt molding according to claim 10, wherein the root portion is located at a position that the lip is fusion-bonded to the upper edge portion of the outer wall and an upper edge portion of the inner wall.

15. A belt molding according to claim 10, wherein the lip is fusion-bonded to the upper edge portion of the outer wall and an upper edge portion of the inner wall.

16. A belt molding according to claim 10, wherein the design tape is fusion-bonded to an upper region of the outer surface of the outer wall.

17. A belt molding according to claim 10, further comprising:
an upper tongue extending from a central portion of an inner surface of the outer wall; and
a lower tongue extending from a lower end of the outer wall.

18. A belt molding according to claim 17, wherein the upper tongue and the lower tongue are in an elastic contact with the upper edge portion of the door panel.

19. A belt molding according to claim 18, further comprising:
an outer wall engagement portion that extends toward an inside of the molding body from an inner surface of the outer wall in a vicinity of the lower end of the outer wall; and
an inner wall engagement portion that extends from an inner surface of the inner wall in a vicinity of a lower end of the inner wall.

20. A belt molding according to claim 19, wherein the outer wall engagement portion and the inner wall engagement portion are engaged with corresponding portions of the door panel.

* * * * *